United States Patent
Masson et al.

(10) Patent No.: US 7,415,622 B2
(45) Date of Patent: Aug. 19, 2008

(54) ADAPTIVE DIGITAL POWER CONTROL SYSTEM

(75) Inventors: Simeon Masson, Tampa, FL (US); Chris Hearn, St. Pete Beach, FL (US); Edward R. Prado, Palm Harbor, FL (US); Brian West, Tampa, FL (US)

(73) Assignee: Honeywell International Inc., Morristown, NJ (US)

( * ) Notice: Subject to any disclaimer, the term of this patent is extended or adjusted under 35 U.S.C. 154(b) by 346 days.

(21) Appl. No.: 11/178,671

(22) Filed: Jul. 11, 2005

(65) Prior Publication Data

US 2007/0010917 A1    Jan. 11, 2007

(51) Int. Cl.
*G06F 1/26* (2006.01)
(52) U.S. Cl. .................. 713/300; 713/310; 713/320; 713/321; 713/322; 713/323; 713/324; 713/330; 713/340
(58) Field of Classification Search ........... 713/300, 713/310, 320–324, 330, 340
See application file for complete search history.

(56) References Cited

U.S. PATENT DOCUMENTS

| | | | | |
|---|---|---|---|---|
| 7,000,125 | B2* | 2/2006 | Chapuis et al. | 713/300 |
| 7,088,197 | B2* | 8/2006 | Brosh et al. | 331/186 |
| 7,136,628 | B2* | 11/2006 | Yang et al. | 455/114.3 |
| 7,319,578 | B2* | 1/2008 | Dieffenderfer et al. | 361/103 |
| 2006/0136757 | A1* | 6/2006 | Chen et al. | 713/300 |

OTHER PUBLICATIONS

Balogh, "A Practical Introduction to Digital Power Supply Control," Texas Instruments, 2005, 29 pages.

* cited by examiner

*Primary Examiner*—Abdelmoniem Elamin
(74) *Attorney, Agent, or Firm*—Fogg & Powers LLC

(57) ABSTRACT

An adaptive digital power control system is disclosed, which implements a digitally controlled, near real-time algorithm to accommodate multiple loop current mode controls for low voltage, high performance computing system power needs. For example, an adaptive digital power control system that is implemented with an FPGA to generate low voltages for high performance computing systems is disclosed, which includes a current and voltage loop compensation algorithm that enables the adaptive digital power control system to dynamically compensate for high current transients and EMI-related noise. The current and voltage loop compensation algorithm uses a combination of linear predictive coding and Kalman filtering techniques to provide dynamic current and voltage compensation, and implement a feed-forward technique using knowledge of the power system's output parameters to adequately adapt to the system's compensation needs. More specifically, an adaptive digital power control system is disclosed, which includes a power stage for generating a plurality of low voltages, a multiplexer and A/D converter stage for receiving and converting the plurality of low voltages and a plurality of associated currents to a plurality of digital voltage and current signals, a current and voltage compensation algorithm stage for receiving the plurality of digital voltage and current signals and generating a plurality of digital voltage and current compensation control signals using linear predictive coding, Kalman filtering and feed-forward estimation techniques, and a digitally controlled pulse width modulator stage for receiving the plurality of digital voltage and current compensation control signals and controlling the duty cycles of a plurality of transistor switching devices in the power stage. Thus, the adaptive digital power control system can dynamically compensate for high current transients and EMI-related noise generated in low voltage power systems for high performance computing systems.

20 Claims, 2 Drawing Sheets

ADAPTIVE DIGITAL POWER CONTROL SYSTEM

FIELD OF THE INVENTION

The present invention relates generally to the field of digital power control systems, and more specifically, but not exclusively, to an adaptive digital power control system.

BACKGROUND OF THE INVENTION

Modern high performance computing systems typically require the use of relatively low unit voltage levels (e.g., typically between 1.0V and 1.8V) as core voltages for their high performance processors operating in the GHz range. The primary aim of this requirement is to minimize the power consumption of the computing systems involved. However, a significant drawback of this requirement is that certain costs are incurred (in terms of dynamic system performance) due to the use of these low voltage levels at such high operating frequencies. For example, the use of low core voltages for processors operating in the GHz range results in the generation of high current transients (e.g., on the order of hundreds of amps per microsecond) and increased noise (e.g., caused by Electromagnetic Interference or EMI) in the power systems involved. Consequently, the high current transients and increased EMI-related noise generated in today's high performance computing systems can severely limit the dynamic response times of the power systems used. Thus, unless these high current transient and noise problems are properly compensated for and resolved, the stability, efficiency and accuracy of the existing high performance computing systems can be severely compromised. More importantly, unless these high current transient and EMI-related noise problems are successfully resolved, the capabilities of the existing high performance computing systems in terms of meeting the stringent requirements of high reliability applications (e.g., very long space missions, smart weapons, missiles, etc.) are in doubt. Therefore, it would be advantageous to have a solution to the problems of high current transients and EMI-related noise generated in the low voltage power supplies of today's high performance computing systems. As described in detail below, the present invention provides an adaptive digital power control system that resolves the high current transients and EMI-related noise problems and other similar noise problems encountered with today's high performance computing systems.

SUMMARY OF THE INVENTION

The present invention provides an adaptive digital power control system that implements a digitally controlled near real-time algorithm to accommodate multiple loop current mode controls for low voltage, high performance computing system power needs. In accordance with a preferred embodiment of the present invention, an adaptive digital power control system that can generate low voltages for high performance computing systems is implemented with an FPGA, which includes a current and voltage loop compensation algorithm that enables the adaptive digital power control system to dynamically compensate for high current transients and EMI-related noise. For this embodiment, the current and voltage loop compensation algorithm uses a combination of linear predictive coding and Kalman filtering techniques to provide dynamic current and voltage compensation, and implement a feed-forward technique using knowledge of the power system's output parameters to adequately adapt to the system's compensation needs. Specifically, for one example embodiment, an adaptive digital power control system is provided, which includes a power stage for generating a plurality of low voltages, a multiplexer and A/D converter stage for receiving and converting the plurality of low voltages and a plurality of associated currents to a plurality of digital voltage and current signals, a current and voltage compensation algorithm stage for receiving the plurality of digital voltage and current signals and generating a plurality of digital voltage and current compensation control signals using linear predictive coding, Kalman filtering and feed-forward estimation techniques, and a digitally controlled pulse width modulator stage for receiving the plurality of digital voltage and current compensation control signals and controlling the duty cycles of a plurality of transistor switching devices in the power stage. Thus, the adaptive digital power control system can dynamically compensate for high current transients and EMI-related noise generated in low voltage power systems for high performance computing systems.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
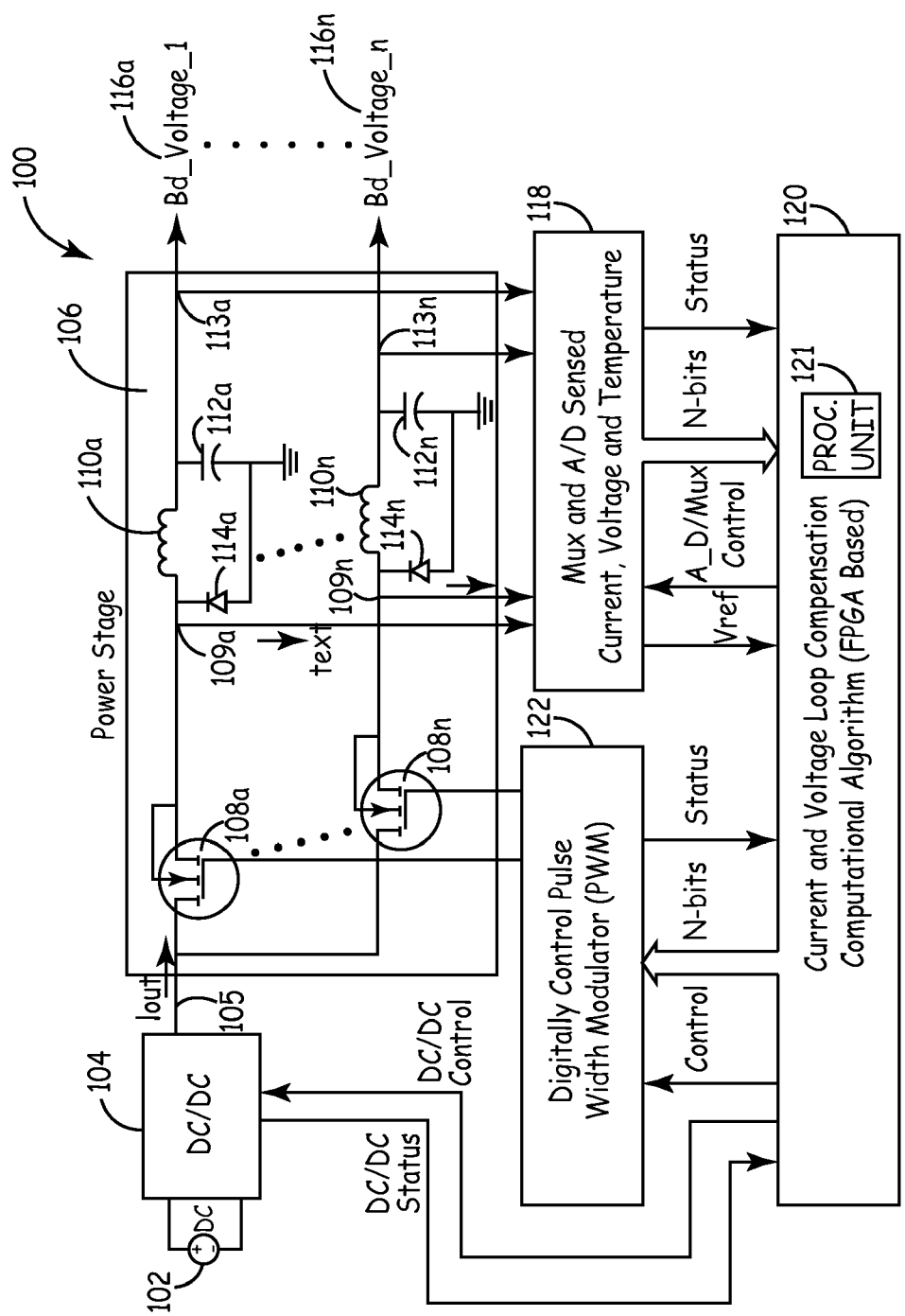
FIG. 1 depicts a block diagram of an example digitally controlled power system, which can be used to implement a preferred embodiment of the present invention.

With reference now to the figures, FIG. 1 depicts a block diagram of an example digitally controlled power (supply) system 100, which can be used to implement a preferred embodiment of the present invention. For example, system 100 can be used to generate a plurality of low core voltages for one or more processors of a high performance computing system operating in the GHz range. However, it should be understood that the present invention is not intended to be limited only to low voltage, high frequency power applications, and can also include, for example, any suitable digitally controlled power supply system that functions to compensate for and minimize high current transients and EMI-related noise or similar types of noise. For example, the present invention can be used for computing systems in certain high performance embedded electronics system applications, such as for the Next Generation Avionics (NGA) System, the Theater High Altitude Area Defense (THAAD) System Upgrade, the Multiple Kill Vehicle (MKV) Missile System, and similar types of high performance, high reliability systems.

For this example embodiment, system 100 includes a DC voltage source 102 coupled to a DC-to-DC voltage step-down stage 104. In an example application, voltage source 102 generates 28.0V DC, and DC/DC voltage step-down stage 104 produces an output of 3.3V DC. The output of DC/DC voltage step-down stage 104 is coupled to an input of power stage 106 via conductor 105. As such, for this example embodiment, the primary function of power stage 106 is to produce a relatively low DC voltage (e.g., in the range between 1.0V and 1.8V) at each connection of a plurality of output connections. For an example application, power stage 106 may produce 1.2V DC at each output connection 116a-116n (e.g., where "n" represents the total number of output connections involved). Essentially, for this embodiment, power stage 106 functions as a switching regulator power supply.

Power stage 106 includes a plurality of transistor devices 108a-108n. For this example embodiment, each one of transistor devices 108a-108n is implemented with an n-channel MOSFET device. However, it should be understood that the present invention is not intended to be so limited, and each transistor device 108a-108n can be implemented with any suitable type of switching device for power supply regulation (e.g., p-channel MOSFET, switching transistor, etc.). As shown, the drain of each transistor device 108a-108n is connected to conductor 105 (and thus to the output of DC/DC voltage step-down stage 104), and the gate of each transistor device 108a-108n is connected to an output connection of digitally controlled Pulse Width Modulator (PWM) stage 122. Also, the source of each transistor device 108a-108n is connected to an input of multiplexer and A/D converter stage 118, and one side of a respective inductor 110a-110n and diode 114a-114n. The second side of each inductor 110a-110n is connected to one side of a respective capacitor 112a-112n, a respective input connection of multiplexer and A/D converter stage 118, and a respective output connection 116a-116n. The second side of each capacitor 112a-112n is connected to the second side of a respective diode 114a-114n and circuit ground. Thus, for this example embodiment, each transistor device 108a-108n functions as a transistor switch, and the switching function of each transistor device 108a-108n is controlled by a signal applied to the gate of each transistor device 108a-108n from a respective output of digitally controlled PWM stage 122. Also, each set of inductors 100a-110n, capacitors 112a-112n, and diodes 114a-114n performs the typical functions of frequency filtering, transient suppression, and/or electrical isolation or decoupling for a respective output connection 116a-116n.

For this example embodiment, multiplexer and A/D converter stage 118 functions primarily to receive each current of the plurality (e.g., "n") of currents from the sources of transistor devices 108a-108n, each voltage of the plurality (e.g., "n") of voltages from the output connections 116a-116n, and if so desired, one or more temperature signals from one or more temperature sensors (not shown) suitably disposed within power stage 106. Also, multiplexer and A/D converter stage 118 converts the analog current, voltage and temperature signals received from power stage 106 to suitable digital current, voltage and temperature signals (e.g., bits). As shown, for this example, a status signal representing the current operational state of multiplexer and A/D converter stage 118 (e.g., contemporaneously sensing and/or converting a current, voltage, temperature, etc.), a digital signal (e.g., composed of n bits) representing each of the converted current, voltage and/or temperature signals received from power stage 106, and a voltage reference signal (e.g., $V_{ref}$) are coupled from multiplexer and A/D converter stage 118 to current and voltage loop compensation computational algorithm stage 120. An A/D and multiplexer control signal is coupled from current and voltage loop compensation computational algorithm stage 120 to multiplexer and A/D converter stage 118.

For illustrative purposes, current and voltage loop compensation computational algorithm stage 120 appear to be portrayed in FIG. 1 as a hardware element, but for this example embodiment, an algorithm for current and voltage loop compensation stage 120 can be implemented as a linear predictive estimation algorithm using software and/or firmware executed by one or more processors (e.g., processing unit 121) arranged in a suitable Field-Programmable Gate Array (FPGA) or similar type of programmable logic device (e.g., ASIC or other semiconductor device designed with field-programmable functions, etc.). As such, in accordance with principles of the present invention, a detailed description of an example linear predictive estimation algorithm that can be used to implement current and voltage (power) loop compensation computational algorithm stage 120 will be described below with respect to FIG. 2.

For this example embodiment, a control signal and a digital signal composed of "n" bits representing a respective current and voltage loop compensation signal for each of the "n" output connections 116a-116n, are coupled from current and voltage loop compensation computational algorithm stage 120 to digitally controlled PWM stage 122. As such, a primary function of digitally controlled PWM stage 122 is to control the accuracy and fidelity of each voltage waveform generated at each output connection 116a-116n of power stage 106, by appropriately controlling the on/off duration (e.g., duty cycle) of each transistor switch device 108a-108n. Also, a status signal representing a current operational state of digitally controlled PWM stage 122 is coupled from digitally controlled PWM stage 122 to current and voltage loop compensation computational algorithm stage 120. Additionally, a control signal is coupled from current and voltage loop compensation computational algorithm stage 120 to DC/DC voltage step-down stage 104, and a status signal representing a current operational state of DC/DC voltage step-down stage 104 is coupled from DC/DC voltage step-down stage 104 to current and voltage loop compensation computational algorithm stage 120. Consequently, for this example embodiment, current and voltage loop compensation computational algorithm stage 120 can function to determine the current operational states, and control in real-time the operations of, DC/DC voltage step-down stage 104, current and voltage loop compensation computational algorithm stage 120, and digitally controlled PWM stage 122. Thus, in accordance with principles of the present invention, system 100 can minimize current transients and EMI-related noise associated with the generation of low voltages for high frequency applications (e.g., in the GHz range), by suitably controlling the duty cycles of the respective transistor switching devices 108a-108n that generate each of the low voltage signals at the output connections 116a-116n of power stage 106.

Figure 2:
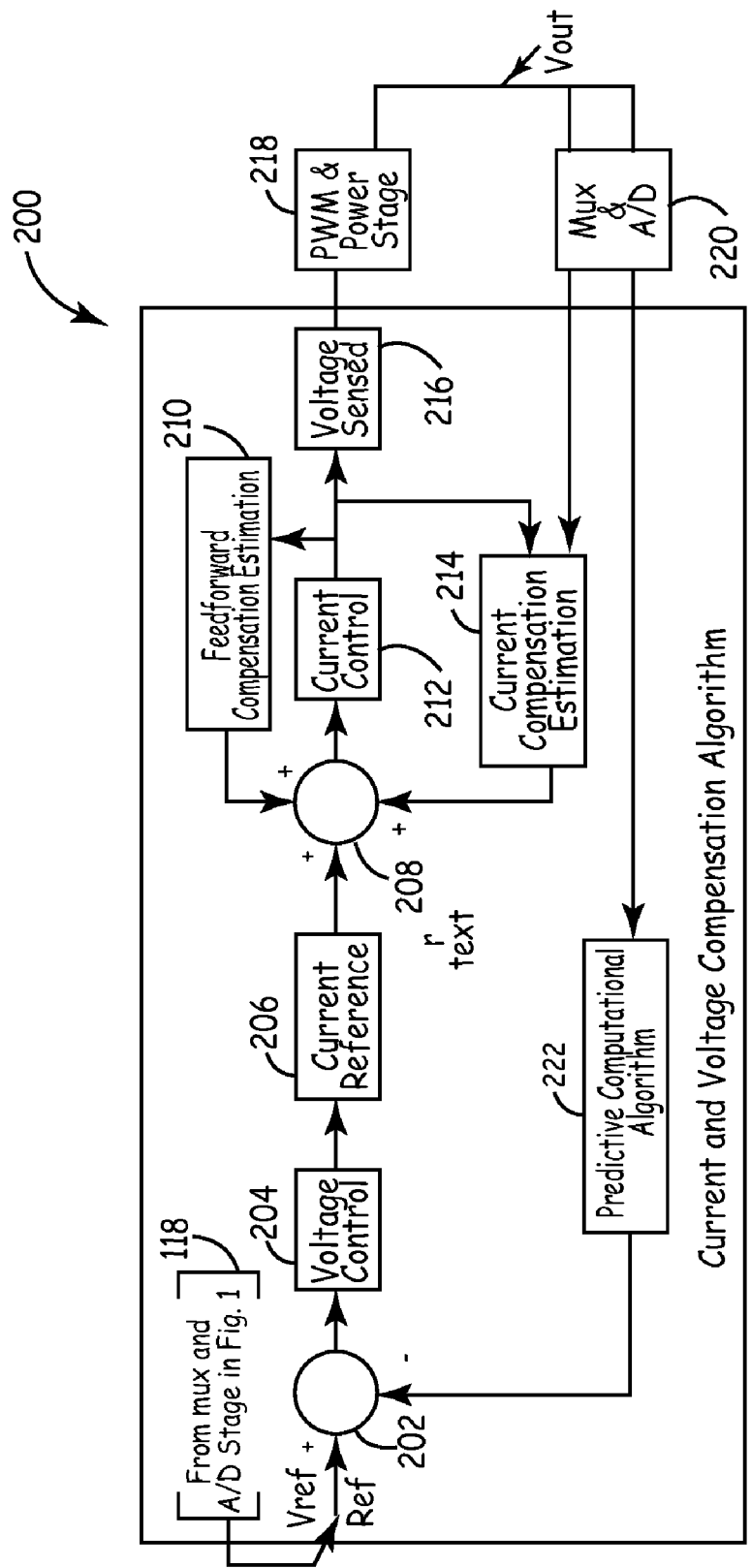
FIG. 2 depicts a block diagram of an example current and voltage compensation algorithm, which can be used to implement a preferred embodiment of the present invention.

FIG. 2 depicts a block diagram of an example current and voltage compensation algorithm 200, which can be used to implement a preferred embodiment of the present invention. For example, current and voltage compensation algorithm 200 can be used to implement current and voltage loop compensation computational algorithm stage 120 in FIG. 1. Also, for example, a pertinent portion of current and voltage compensation algorithm 200 can be implemented with a linear predictive estimation algorithm using software and/or firmware executed by one or more suitable processors (e.g., processing unit 121 in FIG. 1) arranged in an FPGA or similar type of programmable logic device (e.g., ASIC or other semiconductor device designed with field-programmable functions, etc.).

For this example embodiment, referring to FIGS. 1 and 2, current and voltage compensation algorithm 200 (for brevity, hereinafter referred to as "algorithm 200") includes a summer (e.g., algebraic adder) 202. A digital signal representing a positive reference voltage (e.g., $V_{ref}$) received (e.g., from multiplexer and A/D converter stage 118 in FIG. 1) is coupled to an input of summer 202. A low bit rate digital signal at an output of summer 202 is coupled to an input of voltage control unit 204. For this example embodiment, the digital signal at the input of voltage control unit 204 can represent one processed bit of the possible "n" bits that can be coupled from current and voltage loop compensation computational algorithm stage 120 to digitally controlled PWM stage 122 in FIG. 1. An output of voltage control unit 204 is coupled to an input of current reference unit 206. For this example, current reference unit 206 produces at its output a digital signal representing a reference current value associated with the digital signal received from voltage control unit 204. Also, for this example, this digital current reference signal can represent one processed bit of the possible "n" bits that can be coupled from multiplexer and A/D converter stage 118 to current and voltage loop compensation computational algorithm stage 120 in FIG. 1. A positive digital signal at an output of current reference unit 206 is coupled to an input of a second summer 208.

A second positive digital signal is coupled from a feed-forward compensation estimation unit 210 to a second input of summer 208. For this example embodiment, feed-forward compensation estimation unit 210 can be implemented using a suitable Kalman filter algorithm. A Kalman filter is a computational tool that provides an efficient solution of the least-squares method. The primary purpose of a Kalman filter is to estimate the state of a system (e.g., state of power stage 106) from measurements (e.g., sensed currents and/or voltages in power stage 106) that contain random errors. The Kalman filter algorithm processes these (current and/or voltage) measurements to deduce an optimum estimate of the past, present and/or future state of the linear system (e.g., power stage 106) by using a time sequence of measurements of the system's behavior, plus a statistical model that characterizes the system and measurement errors, and the initial conditions. As such, for this example embodiment, feed-forward compensation estimation unit 210 can be implemented as a Kalman filter algorithm to produce an optimum feed-forward compensation estimate in the current control loop of system 200 using, for example, the MATLAB® computing language.

A third positive digital signal is coupled from a current compensation estimation unit 214 to a third input of summer 208. For this example embodiment, current compensation estimation unit 214 can also be implemented using a suitable Kalman filter algorithm to perform an optimum current compensation estimate for the current control loop of system 200 (e.g., using the MATLAB® computing language). A digital signal at an output of summer 208 is coupled to an input of current control unit 212. For this example embodiment, the digital signal at the input of current control unit 212 can represent one processed bit of the possible "n" bits that can be coupled from current and voltage loop compensation computational algorithm stage 120 to digitally controlled PWM stage 122 in FIG. 1. A digital signal at an output of current control unit 212 is coupled to a respective input of voltage sensed unit 216, feed-forward compensation estimation unit 210, and current compensation estimation unit 214. A digital signal is coupled from an output of voltage sensed unit 216 to an input of a PWM and power unit 218. For this example embodiment, PWM and power unit 218 can be implemented using digitally controlled PWM stage 122 and power stage 106 in FIG. 1. Also, the digital signal at the output of voltage sensed unit 216 can represent one processed bit of the possible "n" bits that can be coupled from current and voltage loop compensation computational algorithm stage 120 to digitally controlled PWM stage 122.

A digital signal is coupled from an output of a multiplexer and A/D converter unit 220 to a predictive computational algorithm unit 222. For this example embodiment, predictive computational algorithm unit 222 can be implemented using a suitable linear predictive coding algorithm (e.g. software executed by one or more processors) to represent the spectral envelope of the digital signal from multiplexer and A/D converter unit 220 in compressed form using the information of a linear predictive model. Thus, predictive computational algorithm unit 222 can be used to compress and encode sensed digital current and voltage signals from multiplexer and A/D converter unit 220 to produce a low bit rate digital signal, and also provide a low bit rate digital voltage signal as an extremely accurate estimate of the sensed current and voltage parameters (e.g., from power stage 106) to a second negative input of summer 202. Thus, for this example embodiment, algorithm 200 performs adaptive digital current- and voltage-mode power control for the power system involved (e.g., adaptive digital power control system 100), which adequately compensates for high current transients and EMI-related noise and produces a high performance, dynamic response by highly stable and accurate regulation of the voltages produced by power stage 106.

In operation, referring to FIGS. 1 and 2 for this example embodiment, DC voltage source 102 generates a suitable voltage (e.g., 28.0V), which is stepped down to a lower voltage (e.g., 3.3V) by DC/DC voltage step-down stage 104. If a transistor device (switch) 108a-108n is turned on (e.g., by a suitable signal applied to its gate), then the output current (e.g., $I_{out}$) from DC/DC voltage step-down stage 104 can flow through that transistor device 108a-108n. The current through that device (e.g., transistor 108a) is sensed at the source of that device and coupled (e.g., via junction 109a) to multiplexer and A/D converter stage 118, which converts that current to a corresponding digital current value. A voltage (e.g., 1.2V) generated at the pertinent output connection (e.g., output connection 116a) is coupled (e.g., from junction 113a) to multiplexer and A/D converter stage 118, which converts that voltage to a corresponding digital voltage value. That digital voltage signal (e.g., bit) is provided as a sensed voltage for current and voltage loop compensation computational algorithm 120 (e.g., voltage sensed 216 in algorithm 200). The digital current signal (e.g., bit) is provided as an input value for current compensation estimation unit 214 (e.g., Kalman filter), and the digital voltage signal from multiplexer and A/D converter unit 220 (e.g., multiplexer and A/D converter stage 118 in FIG. 1) is provided as an input value for predictive computational algorithm 222 (e.g., linear predictive coding algorithm). Thus, the adaptive current and voltage loop compensation computational algorithm 120 (e.g., algorithm 200) can continuously sense and adaptively process the current and output voltage levels for each voltage-producing sub-stage in power stage 106.

For this example embodiment, summer 202 algebraically adds the positive digital signal ($V_{ref}$) and negative digital signal (from predictive computational algorithm 222), and the resulting digital signal (bit) is coupled to digitally controlled PWM stage 122 via voltage control unit 204. An associated digital signal is applied to the gate of the appropriate transistor (switch) device (e.g., 108a), which controls the duty cycle of that transistor device. The digital voltage signal from voltage control unit 204 is also applied to current reference unit 206, in order to produce a digital current reference signal at an input of summer 208. This digital current reference signal is algebraically added by summer 208 to the digital signals (e.g., optimum estimates) from feed-forward compensation estimation unit (e.g., Kalman filter) 210 and current compensation estimation unit (e.g., Kalman filter) 214. Each such compensation estimation unit (210, 214) produces an optimum estimate of the future state of power stage 106, based on the real-time measurements of the sensed currents received. The resulting optimally estimated digital current control value is provided to current control unit 212, and this digital current control signal (bit) is sensed (e.g., at voltage sensed unit 216) and coupled as a control bit to PWM and power unit 218 (e.g., to digitally controlled PWM 122). Also, the predictive computational algorithm 222 suitably compresses and encodes the sensed digital current and voltage signals from multiplexer and A/D converter unit 220 (e.g., multiplexer and A/D converter stage 118 in FIG. 1) to produce a low bit rate digital (voltage) signal, which is an extremely accurate estimate of the sensed current and voltage parameters (e.g., from power stage 106), as feedback to the second negative input of summer 202.

Thus, for this example embodiment, an FPGA-based power controller is provided, which implements a digitally-controlled, near real-time algorithm (e.g., current and voltage compensation algorithm) to accommodate multi-loop current mode control for low voltage, high performance computing system needs. The near real-time algorithm is implemented based on a combination of linear predictive coding and Kalman filtering techniques that enable the use of a dynamic current and voltage compensation control approach. Also, the digital power control system applies a feed-forward estimation technique that uses knowledge of the system's output parameters to ensure that the system is adequately adaptive to its compensation needs.

It is important to note that while the present invention has been described in the context of a fully functioning adaptive digital power control system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular digital power control system.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. An adaptive digital power control system, comprising:
   a power stage, said power stage including a plurality of switching units, each switching unit of said plurality of switching units operable to generate a voltage signal and a current signal associated with said voltage signal;
   a converter stage coupled to said power stage, said converter stage operable to convert each said voltage signal to a corresponding digital voltage signal and each said current signal to a corresponding digital current signal;
   a controller stage, said controller stage including a plurality of control outputs, each control output of said plurality of control outputs coupled to a control input of a respective switching unit of said plurality of switching units of said power stage; and
   a processing unit coupled to said converter stage and said controller stage, said processing unit operable to:
   receive at least one of said digital voltage signals and at least one of said digital current signals;
   execute a current and voltage compensation algorithm responsive to said at least one of said digital voltage signals and said at least one of said digital current signals; and
   produce at least one control signal responsive to the operation to execute, said at least one control signal operable to control an on duration of at least one switching unit of the plurality of switching units.

2. The adaptive digital power control system of claim 1, wherein said each switching unit comprises a transistor switch.

3. The adaptive digital power control system of claim 1, wherein said each switching unit comprises an n-channel MOSFET device.

4. The adaptive digital power control system of claim 1, wherein said converter stage comprises a multiplexer and A/D converter stage.

5. The adaptive digital power control system of claim 1, wherein said controller stage comprises a digitally controlled PWM stage.

6. The adaptive digital power control system of claim 1, wherein said processing unit comprises a component of a Field-Programmable Gate Array.

7. The adaptive digital power control system of claim 1, wherein said processing unit comprises a component of an Application-Specific Integrated Circuit.

8. The adaptive digital power control system of claim 1, wherein said at least one control signal is operable to control a duty cycle of a switching unit of said plurality of switching units of said power stage.

9. The adaptive digital power control system of claim 1, wherein said processing unit is further operable to:
   execute a feed-forward compensation estimation algorithm and a current compensation estimation algorithm responsive to said at least one of said digital current signals; and
   produce a current control signal associated with an output of said feed-forward compensation estimation algorithm and an output of said current compensation estimation algorithm.

10. The adaptive digital power control system of claim 1, wherein said processing unit is further operable to:
    execute a predictive computational algorithm responsive to said at least one of said digital voltage signals; and
    produce a voltage control signal associated with an output of said predictive computational algorithm.

11. A digital power control system, comprising:
    a power stage including a plurality of transistor switches, each transistor switch of said plurality of transistor switches operable to produce a respective voltage and a current associated with said respective voltage;
    a processing unit coupled to said power stage, said processing unit operable to:
    receive at least one of said respective voltage and said current associated with said at least one of said respective voltage;
    execute a feed-forward compensation estimation algorithm and a current compensation estimation algorithm responsive to said current associated with said at least one of said respective voltage;

produce a current control signal associated with an output of said feed-forward compensation estimation algorithm and an output of said current compensation estimation algorithm;

execute a predictive computational algorithm responsive to said at least one of said respective voltage; and produce a voltage control signal associated with an output of said predictive computational algorithm; and a pulse width modulator unit coupled to said processing unit and said power stage, said pulse width modulator unit operable to:

control a turn on time of at least one transistor switch of said plurality of transistor switches responsive to at least one of said voltage control signal and said current control signal.

12. The digital power control system of claim 11, wherein said plurality of transistor switches comprises a plurality of n-channel MOSFET devices.

13. The digital power control system of claim 11, wherein said processing unit comprises a component of a Field-Programmable Gate Array.

14. The digital power control system of claim 11, wherein said processing unit comprises a component of an Application-Specific Integrated Circuit.

15. A method for adaptive digital power control, comprising the steps of:

responsive to at least one control signal, generating a plurality of voltage signals and a plurality of current signals associated with said plurality of voltage signals;

converting said plurality of voltage signals to a corresponding plurality of digital voltage signals and said plurality of current signals to a corresponding plurality of digital current signals;

receiving at least one digital voltage signal of said plurality of digital voltage signals and at least one digital current signal of said plurality of digital current signals;

executing a current and voltage compensation algorithm responsive to said at least one digital voltage signal and said at least one digital current signal; and responsive to the executing step, producing said at least one control signal and controlling an on duration of at least one transistor switch of a plurality of transistor switches associated with a power stage.

16. The method of claim 15, wherein the generating step is performed by the plurality of transistor switches.

17. The method of claim 15, wherein the generating step is performed by a plurality of n-channel MOSFET devices.

18. The method of claim 15, wherein the executing step further comprises the steps of:

executing a feed-forward compensation estimation algorithm and a current compensation estimation algorithm responsive to said at least one digital current signal;

producing a current control signal associated with an output of said feed-forward compensation estimation algorithm and an output of said current compensation estimation algorithm;

executing a predictive computational algorithm responsive to said at least one digital voltage signal; and producing a voltage control signal associated with an output of said predictive computational algorithm, said current control signal and said voltage control signal associated with said at least one control signal.

19. A computer program product, comprising:

a tangible computer-usable medium having computer-readable code embodied therein for configuring a computer processor, the computer program product comprising:

a first executable computer-readable code configured to cause a computer processor to generate a plurality of voltage signals and a plurality of current signals associated with said plurality of voltage signals responsive to at least one control signal;

a second executable computer-readable code configured to cause a computer processor to convert said plurality of voltage signals to a corresponding plurality of digital voltage signals and said plurality of current signal to a corresponding plurality of digital current signals;

a third executable computer-readable code configured to cause a computer processor to receive at least one digital voltage signal of said plurality of digital voltage signals and at least one digital current signal of said plurality of digital current signals;

a fourth executable computer-readable code configured to cause a computer processor to execute a current and voltage compensation algorithm responsive to said at least one digital voltage signal and said at least one digital current signal;

a fifth executable computer-readable code configured to cause a computer processor to produce said at least one control signal responsive to an execution of the fourth executable computer readable code; and a sixth executable computer-readable code configured to cause a computer processor to control an on duration of at least one switching unit of a plurality of switching units associated with a power stage.

20. The computer program product of claim 19, wherein an execution of said fourth executable computer-readable code comprises:

a seventh executable computer-readable code configured to cause a computer processor to execute a feed-forward compensation estimation algorithm and a current compensation estimation algorithm responsive to said at least one digital current signal;

an eighth executable computer-readable code configured to cause a computer processor to produce a current control signal associated with an output of said feed-forward compensation estimation algorithm and an output of said current compensation estimation algorithm;

a ninth executable computer-readable code configured to cause a computer processor to execute a predictive computational algorithm responsive to said at least one digital voltage signal; and a tenth executable computer-readable code configured to cause a computer processor to produce a voltage control signal associated with an output of said predictive computational algorithm, said current control signal and said voltage control signal associated with said at least one control signal.

* * * * *